United States Patent
Kelly et al.

(10) Patent No.: US 7,437,246 B2
(45) Date of Patent: Oct. 14, 2008

(54) METHOD OF DETERMINING A COLLISION AVOIDANCE MANEUVER

(75) Inventors: Bradley D. Kelly, Denver, CO (US); Solomon A. De Picciotto, Centennial, CO (US)

(73) Assignee: Raytheon Company, Waltham, MA (US)

( * ) Notice: Subject to any disclaimer, the term of this patent is extended or adjusted under 35 U.S.C. 154(b) by 39 days.

(21) Appl. No.: 11/771,737

(22) Filed: Jun. 29, 2007

(65) Prior Publication Data

US 2008/0033648 A1    Feb. 7, 2008

Related U.S. Application Data

(63) Continuation of application No. 11/672,442, filed on Feb. 7, 2007.

(60) Provisional application No. 60/835,102, filed on Aug. 1, 2006.

(51) Int. Cl.
*B60W 30/08* (2006.01)
*G08G 1/16* (2006.01)

(52) U.S. Cl. ..................................... 701/301

(58) Field of Classification Search ......... 701/300–302; 340/436, 945, 961, 963; 342/29
See application file for complete search history.

(56) References Cited

U.S. PATENT DOCUMENTS

| | | | | |
|---|---|---|---|---|
| 3,691,559 A | * | 9/1972 | Jackson | 342/458 |
| 5,471,214 A | * | 11/1995 | Faibish et al. | 342/70 |
| 5,638,281 A | * | 6/1997 | Wang | 701/301 |
| 6,102,334 A | | 8/2000 | Claffey et al. | 244/158 |
| 6,302,354 B1 | | 10/2001 | Patera | 244/3.15 |
| 6,408,248 B1 | | 6/2002 | Yancey, Jr. et al. | 701/301 |
| 6,484,973 B1 | | 11/2002 | Scott | 244/161 |
| 6,691,034 B1 | | 2/2004 | Patera et al. | 701/301 |
| 6,694,283 B2 | | 2/2004 | Alfano et al. | 702/150 |
| 6,751,547 B2 | | 6/2004 | Khosla | 701/200 |
| 6,785,610 B2 | | 8/2004 | Baker et al. | 701/301 |
| 6,820,006 B2 | | 11/2004 | Patera | 701/301 |
| 6,843,446 B2 | | 1/2005 | Scott | 244/10 |

\* cited by examiner

*Primary Examiner*—Yonel Beaulieu
(74) *Attorney, Agent, or Firm*—Glenn H. Lenzen, Jr.

(57) ABSTRACT

A method of determining a collision avoidance maneuver includes obtaining initial state data including initial state data for a first object and a second object. A plurality of preliminary maneuvers satisfying a first set of constraints are generated using the initial state data. A best preliminary maneuver is selected from the plurality of preliminary maneuvers, and the best preliminary maneuver is optimized according to an objective function to provide a final maneuver. The optimization adheres to a provided second set of constraints.

30 Claims, 7 Drawing Sheets

METHOD OF DETERMINING A COLLISION AVOIDANCE MANEUVER

RELATED MATERIALS

This application is a continuation of U.S. application Ser. No. 11/672,442, filed Feb. 7, 2007 and incorporated herein by reference, and further claims priority to U.S. Provisional application No. 60/835,102, filed Aug. 1, 2006 and incorporated herein by reference, the Provisional application No. 60/835,102 being claimed for priority by application Ser. No. 11/672,442 as well.

FIELD

This invention relates generally to the field of preventing a collision between two or more objects, and more specifically to determining a collision avoidance maneuver executable by a first object to reduce a risk of it colliding with a second object.

BACKGROUND

Many situations exist wherein there is a significant potential for a first moving object to collide with a second object. Such situations are often referred to as conjunctions. An example of a conjunction is a situation wherein a ship traveling on a body of water is at risk of colliding with another nearby ship. Another example of a conjunction is the situation wherein a space asset, such as a satellite, is at risk of colliding with a piece of orbital debris, such as the remains of a damaged rocket.

For the most part, such potential collisions are undesirable. For example, if a ship collides with another ship, personal injuries, loss of life, and/or property damage may occur. If a satellite collides with orbital debris, the satellite may be damaged or destroyed.

If a conjunction is identified, one or more of the potentially colliding objects may are often referred to as maneuvers. A maneuver includes one or more maneuver parameters that define the maneuver. For example, a maneuver's parameters may consist of an epoch, which defines when an object is to execute the maneuver, and a delta velocity vector, which defines how an object's execution of the maneuver will change the object's velocity. As another example, a maneuver's parameters may consist of a start epoch, which defines when an object is to execute the maneuver, a thrust direction, which defines what direction a thruster with specified characteristics is to apply force or thrust to the object, and a burn duration of the thruster.

Unfortunately, an object's execution of a maneuver may create negative side effects. For example, fishing activity or scientific research on a ship may be disrupted if the ship executes a maneuver consisting of changing its velocity. As another example, a satellite's observation activities may be disrupted if the satellite executes a maneuver consisting of changing its path of travel. Furthermore, a satellite may be required to expend energy to execute a maneuver. Such expenditure of energy may be highly undesirable because satellites often have a finite energy source that cannot be replenished. Consequently, if the satellite has to expend significant energy executing one or more maneuvers, its useful lifetime may be decreased.

Negative side effects associated with an object's execution of a maneuver can often be reduced by decreasing the magnitude of one or more of the maneuvers parameters. For example, if a ship or satellite needs to execute a maneuver consisting of changing the ship's or the satellite's velocity, minimizing the delta velocity vector's magnitude may minimize negative side effects. However, a desire to minimize the magnitude of a maneuver's parameters must be balanced against a requirement that the maneuver's parameters have sufficient magnitude to reduce a likelihood of a collision to an acceptable level.

Hence, there is a need for a method of determining a collision avoidance maneuver that is optimized to minimize the magnitude of one or more of its parameters while assuring that the maneuver will accomplish its objectives.

SUMMARY

This invention provides a method of determining a collision avoidance maneuver and more specifically a method of determining a collision avoidance maneuver that is optimized to minimize the magnitude of one or more of its parameters while assuring that the maneuver will accomplish its objectives In particular, and by way of example only, a method of determining a collision avoidance maneuver includes obtaining initial state data including initial state data for a first object and a second object. A plurality of preliminary maneuvers satisfying a first set of constraints are generated using the initial state data. A best preliminary maneuver is selected from the plurality of preliminary maneuvers, and the best preliminary maneuver is optimized according to an objective function to provide a final maneuver. The optimization adheres to a provided second set of constraints.

According to another embodiment, a method of determining a collision avoidance maneuver includes obtaining initial state data including position data, position covariance data, and velocity data for a first object and a second object. A plurality of preliminary maneuvers are determined by a method including the steps of (1) determining a plurality of points, wherein each point has a unique combination of maneuver parameters including an epoch value, a yaw value, a pitch value, and a general maneuver direction; (2) creating a preliminary maneuver from each point, wherein each preliminary maneuver initially has a predetermined minimum delta velocity vector magnitude; (3) simulating each preliminary maneuver and evaluating parameters constrained by a first set of constraints; and (4) increasing the delta velocity vector magnitude of each preliminary maneuver in discrete steps until the preliminary maneuver adheres to the first set of constraints. A preliminary maneuver having a smallest delta velocity vector magnitude is designated as a best preliminary maneuver. The best preliminary maneuver is optimized according to an objective function to provide a final maneuver using a numerical optimizer subsystem, wherein the final maneuver has approximately the smallest delta velocity vector magnitude that will allow the final maneuver to adhere to a second set of constraints.

According to another embodiment, a method of determining a collision avoidance maneuver includes obtaining initial state data including position data, position covariance data, and velocity data for a first object and a second object. A plurality of preliminary maneuvers are determined by a method including the steps of (1) determining a plurality of points, wherein each point has a unique combination of maneuver component elements including a start epoch value, a yaw value, a pitch value, and a general maneuver direction; (2) creating a preliminary maneuver from each point, wherein each preliminary maneuver initially has a predetermined minimum burn duration; (3) simulating each preliminary maneuver and evaluating parameters constrained by a first set of constraints; and (4) increasing the burn duration of each preliminary maneuver in discrete steps until the preliminary maneuver adheres to the first set of constraints. A preliminary maneuver having a smallest burn duration is designated as a best preliminary maneuver. The best preliminary maneuver is optimized according to an objective function to provide a final maneuver using a numerical optimizer subsystem, wherein the final maneuver has approximately the shortest burn duration that will allow the final maneuver to adhere to a second set of constraints.

According to another embodiment, a computer system for determining a collision avoidance maneuver includes a processing unit, a memory storage device coupled to the processing unit, an input device coupled to the processing unit, and an output device coupled to the processing unit. The processing unit is operative to (1) obtain initial state data including initial state data for a first object and a second object; (2) generate a plurality of preliminary maneuvers satisfying a first set of constraints using the initial state data; (3) select a best preliminary maneuver from the plurality of preliminary maneuvers; and (4) optimize the best preliminary maneuver according to an objective function to provide a final maneuver, wherein the optimization adheres to a provided second constraint.

In yet another embodiment, a software product includes instructions stored on computer-readable media, wherein the instructions, when executed by a computer, perform steps for determining a collision avoidance maneuver. The instructions include (1) an input routine operatively associated with an input device for obtaining initial state data including initial state data for a first object and a second object; (2) a preliminary maneuver generating routine for generating a plurality of preliminary maneuvers satisfying a first set of constraints using the initial state data; (3) a selection routine for selecting a best preliminary maneuver from the plurality of preliminary maneuvers; and (4) an optimizing routine for optimizing the best preliminary maneuver according to an objective function to provide a final maneuver, the optimization routine adhering to a provided second constraint.

DETAILED DESCRIPTION

The present teaching is by way of example only, not by way of limitation. The concepts herein are not limited to use or application with a specific method of determining a collision avoidance maneuver. Thus, although the instrumentalities described herein are for the convenience of explanation, shown and described with respect to exemplary embodiments, it will be appreciated that the principles herein may be applied equally in other methods of determining a collision avoidance maneuver.

Figure 1:
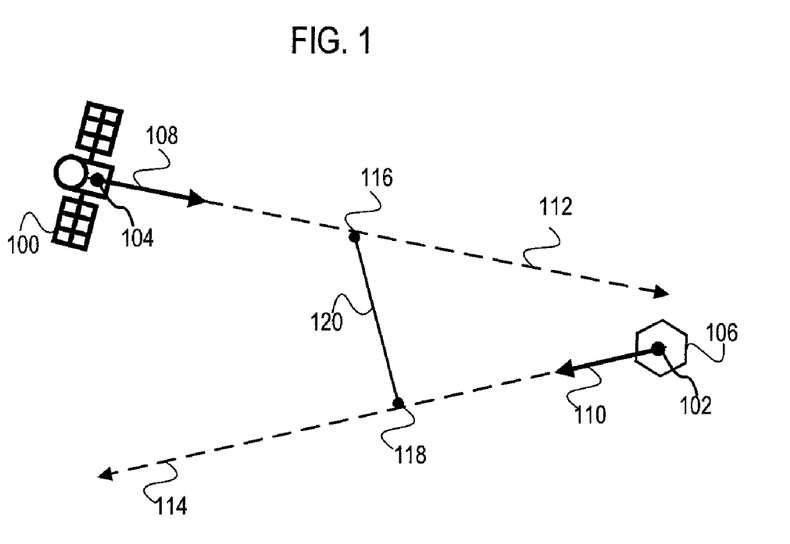
FIG. 1 schematically illustrates an example of a conjunction between a first object and a second object.

FIG. 1 schematically illustrates an example of a conjunction between a first object 100 and a second object 102. As stated above, a conjunction is a situation wherein there is a significant potential for a moving first object 100 to collide with a second object 102. As an example, the first object 100 may be a space asset, such as a satellite, and the second object 102 may be a piece of orbital debris.

The conjunction illustrated in FIG. 1 is linear; accordingly, FIG. 1 is technically applicable solely to situations wherein the velocities of the first object 100 and the second object 102 are constant. However, FIG. 1 may also adequately approximate a condition wherein the first and/or second object 102 are accelerating or decelerating if the magnitude of their relative velocity, which is the difference between the velocities of the first and second objects, is large. Such condition is commonly encountered in conjunctions; consequently, FIG. 1 adequately approximates many conjunctions.

FIG. 1 represents the states of the first and the second object 102 at a time close to the time of an expected conjunction ("initial time" or $t_o$). The initial time is illustrated in FIG. 1 as being before the conjunction, however, FIG. 1 could be modified such that it represents a situation wherein $t_o$ is after the conjunction. At $t_o$, the first object 100 is at position 104, and the second object 102 is at position 106. The first object 100 has velocity 108, and consequently, is expected to travel along path 112. The second object 102 has velocity 110, and consequently, is expected to travel along path 114. Velocities 108 and 110 are considered to be constant. Paths 112 and 114 and velocities 108 and 110 may be represented by two or three dimensional vectors.

It should be noted that paths 112 and 114 are expected values and the actual paths of the first object 100 and the second object 102 may differ from the expected values. The uncertainty in paths 112 and 114 results from uncertainty in positions 104 and 106 as well as uncertainty in velocities 108 and 110. Position 104 and velocity 108 are used to determine path 112, and position 106 and velocity 110 are used to determine path 114. Consequently, uncertainty in a position and/or a velocity value propagates to a path determined from these values. This degree of uncertainty in path and position is further illustrated in FIG. 2, further discussed below, wherein the uncertainties of two conjuncting objects are represented with ellipsoids.

The uncertainty of positions 104 and 106 may be described by respective covariance matrices, which will be discussed in more detail below. The uncertainty of velocities 108 and 110 may also be described by respective covariance matrices, however, such covariance matrices are not required to determine a collision avoidance maneuver according to the instant invention.

Positions 104 and 106, velocities 108 and 110, $t_o$ and any covariance matrices may be individually or collectively referred to as initial state data. Such initial state data may be obtained from an acceptable source, such as a government's space command agency. Initial state data for an object may be housed in a state vector for the object.

It is not known with certainty whether the first object 100 will collide with the second object 102 because the positions and the velocities of the two objects are not known with certainty. However, when a conjunction is identified, the conjunction may be analyzed to evaluate the risk of a collision. Aspects of the conjunction can be compared against predetermined thresholds to determine whether a risk of a collision is sufficiently great to warrant determination and execution of a collision avoidance maneuver.

One aspect of conjunction that may be evaluated is minimum miss distance ("MMD") 120. MMD 120 is the distance between the first object 100 and the second object 102 at the time they are expected to be closest together ("time of closest approach" or "TCA"). In FIG. 1, the TCA occurs when the first object 100 is at position 116 and the second object 102 is at position 118.

A relatively small MMD 120 indicates that the first and second objects are expected to pass relatively close to each other during their expected courses of travel. Consequently, a relatively small MMD 120 may indicate an unacceptably high likelihood of collision. Accordingly, the value of MMD 120 may be considered when analyzing a conjunction and determining if there is a need for a collision avoidance maneuver. For example, in an embodiment, MMD 120 may be compared to a first threshold. In this embodiment, determination and execution of a collision avoidance maneuver is necessary if MMD 120 is below the first threshold.

MMD 120 may be determined from Equation 1, $$\text{MMD} = \left| r_{rel}(0) - \frac{r_{rel}(0) \cdot v_{rel}}{v_{rel} \cdot v_{rel}} v_{rel} \right| \text{meters}, \quad \text{Equation 1}$$

wherein $r_{rel}(0)$ is the distance in meters between the first object 100 and the second object 102 at $t_o$, and wherein $v_{rel}$ is the relative velocity ($v_{rel}$) in meters per second between the first object 100 and the second object 102 at $t_o$. It is of course understood and appreciated that units other than meters may be used. It should be noted that the dots in Equation 1 symbolize the dot product, or inner product, of corresponding vectors.

TCA can be determined from Equation 2, $$\text{TCA} = \frac{-r_{rel}(0) \cdot v_{rel}}{v_{rel} \cdot v_{rel}} + t_0. \quad \text{Equation 2}$$

As with Equation 1, the dots symbolize the dot product, or inner product, of corresponding vectors. Equations 1 and 2 are based on the conjunction illustrated in FIG. 1; accordingly, Equations 1 and 2 assume that the velocities of the first object 100 and the second object 102 remain constant during the time close to the conjunction. As stated above, FIG. 1 may adequately approximate a conjunction wherein the relative velocity ($v_{rel}$) of the two objects is large. Accordingly, Equations 1 and 2 may adequately approximate MMD and TCA respectively in conjunctions wherein the relative velocity ($v_{rel}$) of the two objects is large.

If the linear approximations of FIG. 1 and Equation 2 are not appropriate for a conjunction, such as if the relative velocity ($v_{rel}$) of the two objects is not sufficiently large, the TCA may need to be determined using methods other than Equation 2. For example, the TCA may be determined by a method employing numerical minimization of the relative position ($v_{rel}$) of the first object 100 and the second object 102.

Another aspect of a conjunction that may be evaluated is the probability that the first object 100 may collide with the second object 102, i e., the Probability of Collision ($P_C$) Specifically, $P_C$ may be defined as the probability that the relative position ($r_{rel}$(TCA)) of the first object 100 and the second object 102 is within a combined sphere of radius R, wherein $r_{rel}$(TCA) is the distance between the first object 100 and the second object 102 at the TCA. In an embodiment, $P_C$ may be compared to a second threshold, and execution of a collision avoidance maneuver is necessary if $P_C$ is above the second threshold.

$P_C$ may be determined through the following procedure. First, the relative covariance matrix $C_{rel}$ is determined from Equation 3, $$C_{rel} = C_0 + C_1, \quad \text{Equation 3,}$$

wherein $C_0$ is the position covariance matrix expressing uncertainty in the first object's position at the TCA, and $C_1$ is the position covariance matrix expressing uncertainty in the second object's position at the TCA. It should be noted that Equation 3 applies only if the first object's and the second object's position uncertainties are uncorrelated.

It is assumed that a velocity component normal to relative velocity $v_{rel}$ (difference between the velocities of the first object 100 and the second object 102 at the TCA) is the only velocity component that affects $P_C$. Using this assumption, $C_{rel}$ is projected into a plane normal to $v_{rel}$ as follows. Linear map vector T(x) is determined from Equation 4, $$T(x) = x - (x \cdot \hat{v}_{rel}) \hat{v}_{rel}, \quad \text{Equation 4,}$$

wherein vector x is the input vector that is being mapped. Vector $\hat{v}_{rel}$ may be determined from Equation 5, $$\hat{v}_{rel} = \frac{v_{rel}}{\|v_{rel}\|}. \quad \text{Equation 5}$$

Map T(x) is used to project $C_{rel}$ into the relative velocity $v_{rel}$ normal plane using Equations 6 and 7 as follows:

$$M = \begin{bmatrix} T(\hat{i})^T \\ T(\hat{j})^T \\ T(\hat{k})^T \end{bmatrix} \quad \text{Equation 6}$$

$$C = M^T C_{rel} M \quad \text{Equation 7}$$

Matrix C is a rank two covariance matrix of relative position vectors ($r_{rel}$) in the plane normal to $v_{rel}$. Vectors $\hat{i}$, $\hat{j}$, and $\hat{k}$ are unit basis vectors. Specifically, $\hat{i} = [1,0,0]^T$, $\hat{j} = [0,1,0]^T$, and $\hat{k} = [0,0,1]^T$.

The two non-zero eigen values of matrix C, $\sigma_A$, and $\sigma_B$, are determined. The corresponding eigen vectors of matrix C, $e_A$, and $e_B$, are also determined. The quantities $m_A$ and $m_B$ are determined from Equations 8 and 9, respectively, $$m_A = r_{rel} \cdot e_A, \text{ and} \quad \text{Equation 8}$$

$$m_B = r_{rel} \cdot e_B. \quad \text{Equation 9}$$

Finally, $P_C$ may be determined from Equation 10 as follows:

$$P_C = \frac{1}{2\pi\sigma_A\sigma_B} \int_{D_R} \exp\left[-\frac{1}{2}\left(\left(\frac{x-m_A}{\sigma_A}\right)^2 + \left(\frac{y-m_B}{\sigma_B}\right)^2\right)\right] dA \quad \text{Equation 10}$$

wherein $D_R$ is the disk of radius R, wherein R is the combined radius of the first and second objects as stated above.

With respect to the above equations and process, the probability of collision is a function of the states of the conjuncting objects, their sizes and their covariances. Of these elements, the probability of collision ($P_c$) is most sensitive to errors in covariance. As covariance is the measure of how much random variables vary together, the covariance matrix is a matrix of covariances between elements of a vector, in this case the trajectory path of an object.

Figure 2:
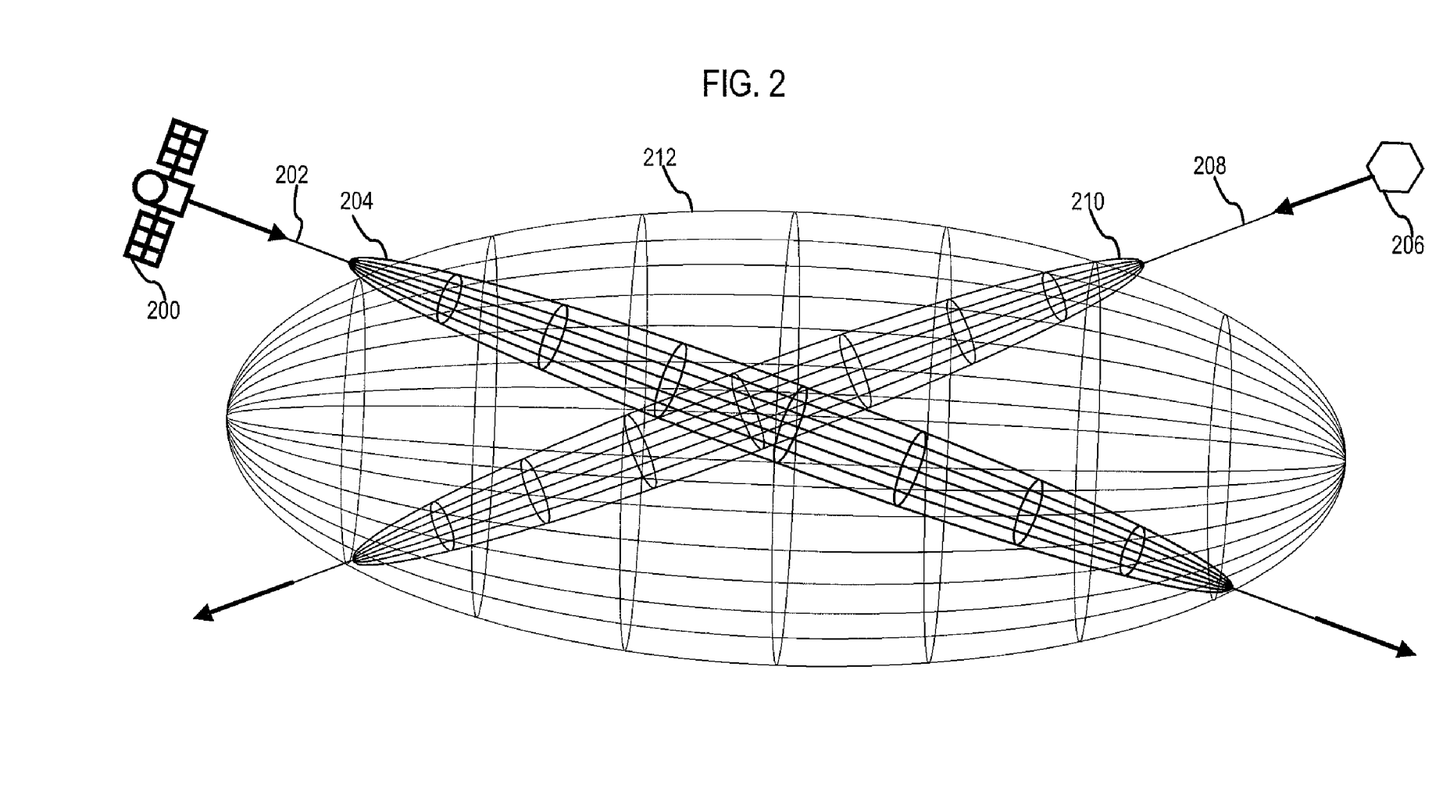
FIG. 2 is an illustration of covariance ellipsoids and the resulting relative position covariance ellipsoid.

FIG. 2 illustrates two objects at a close approach surrounded by their position covariance ellipsoids. Specifically, object 200 (e.g., object 0) is traveling along path 202 with a position covariance ellipsoid 204. Object 206 (e.g., object 1) is traveling along path 208 with a position covariance ellipsoid 210. When combined, these two position covarience ellipsoids 204 and 210 provide the relative position covariance ellipsoid 212.

Small changes in either covariance will cause small changes in the relative covariance. However, as is apparent from Equation 10, changes in the relative covariance will cause large changes in the probability of collision. Indeed, in many instances due to a lack of dynamic model errors, estimates of covariance can often be too optimistic.

With respect to Equation 3 above, in at least one embodiment $C_{rel}=C_0+C_1$. In this embodiment, $C_{rel}$ is considered to be a constant formed from two other constants in the system, specifically the component covariances $C_0$ and $C_1$. As the covariance is a constant and probability is a function of this constant covariance, the determined Pc is a nominal probability.

In at least one embodiment, rather than considering $C_{rel}$ as a constant, the relative covariance is permitted to change in one dimension through the use of a scale factor K. More specifically, in at least one embodiment, the relative covariance $C_{rel}$ is scaled by a factor of $K^2$. As a function of this factor, typical probability curves are similar to what is depicted in FIG. 3.

Figure 3:
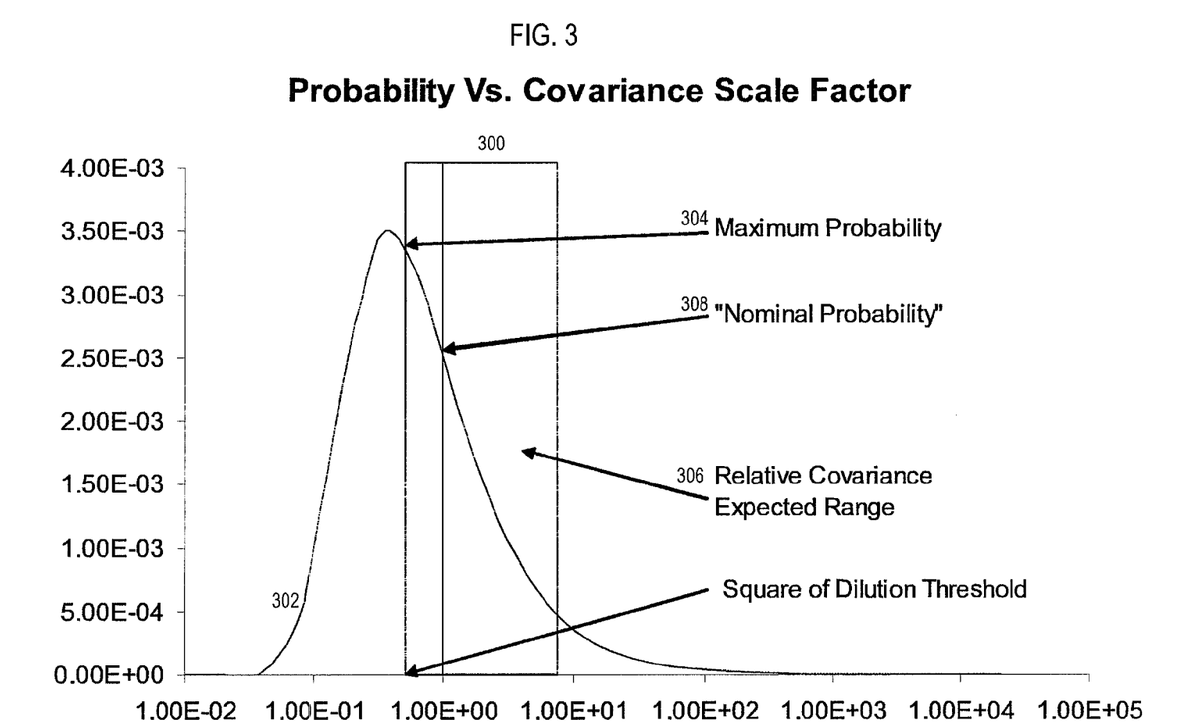
FIG. 3 presents a graph of probability versus covariance scale factor in accordance with at least one embodiment.

With respect to FIG. 3, $K^2$ is displayed on the x-axis. Unless there is no confidence in the covariance estimates, only a bounded region 300 of the curve 302 is of interest. When $K^2=1$, $P_c$ is as shown in the graph. Somewhere on this interval, the probability will be at a maximum 304, e.g $P_{max}$. The value of K at the maximum probability is commonly known as the "dilution threshold." It is of course understood and appreciated that the graph of FIG. 3 presents only one example, rendered for the sake of ease of discussion and illustration.

The band of possible relative covariances, $C_{rel}$ can lie to the left or the right of the global maximum, or bound it. When the band is to the left of the maximum, the band encompasses a sharp slope in the curve. This portion of the curve implies that a small uncertainty in the covariances can result in a sharp change in the probability of collision. When the band lies completely to the right of the global maxim, as shown, the relative covariance 306 may be too large to permit a good decision. It is therefore desirable to determine the maximum probability 304.

The maximum probability 304 is determined by non-linear optimization. Specifically, with respect to scalar K, relative covariance, $C_{rel}$ may be defined by the following function.

$$C_{rel}(K)=K^2(C_0+C_1)$$

$$K_a \leq K \leq K_b \quad \text{Equation 11}$$

It is of course understood and appreciated that the degree of confidence in one covariance, e.g., $C_0$, may be greater than the confidence in the other covariance, e.g., $C_1$, or vis-a-versa. This may result, for example, due to one object being a piece of space debris with more uncertain drag characteristics. In this case, it is desirable to solve a two dimensional optimization problem of finding the maximum probability on a square bounded by the covariance bounds, expressed as Equation 12:

$$C_{rel}(K_0,K_1)=K_0^2 C_0+K_1^2 C_1$$

$$K_{0,a} \leq K_0 \leq K_{0,b}$$

$$K_{1,a} 23 K_1 \leq K_{1,b} \quad \text{Equation 12}$$

Moreover, in accordance with varying embodiments of the present invention, $C_{rel}$ is selectively determined as a constant (Equation 3), as a function of change in one dimension K upon the relative covariance (Equation 11), and/or as a function of change across two variables $K_0$ and $K_1$ which are scales of the component covariances $C_o$ and $C_1$ (Equation 12).

With respect to FIG. 3, Equation 3 when applied will provide the nominal probability, e.g. $P_{nom}$ of collision 308. Equations 11 and 12 respectively pay greater attention to the component covariances $C_o$ and $C_1$ and provide values closer to the maximum probably, e.g. $P_{max}$, in the first instance of Equation 11 on the interval [$K_a$, $K_b$], and in the second instance of Equation 12 on the box defined by the range of $K_0$ and $K_1$. More explicitly, $P_{nom}$ and $P_{max}$ may be understood as follows:

$$P_{nom}=P_C(C_{rel})$$

and $$P_{max}=\text{Maximize } P_c(C_{rel}(K)) \text{ over the domain of } K$$

or $$P_{max}=\text{Maximize } P_c(C_{rel}(K_0, K_1)) \text{ over the domain of } K_0 \text{ and } K_1$$

Each of these probabilities is increasingly more conservative and computationally more expensive to derive. This is not to suggest that maneuver calculations based on $C_{rel}$ as derived from Equation 3 and the resulting $P_{nom}$ are unreliable with respect to the $C_{rel}$ as from Equation 12 and the resulting $P_{max}$. Rather the above discussion and formula illustrate how embodiments of determining collision avoidance may be varied in accordance with specific situations and or operator preferences.

Indeed, due to a variety of possibilities, the computationally less impacting calculations of Equation 3 may be preferred in some embodiments, such as for example, where speed in determining $P_c$ is more important than the value of $P_c$ as $P_{nom}$ or $P_{max}$. In at least one further embodiment, Equation 3 is employed as a first round and Equation 11 or 12 are substituted on a second round if the determined value of $C_{rel}$ is within a user defined range of concern.

Figure 4:
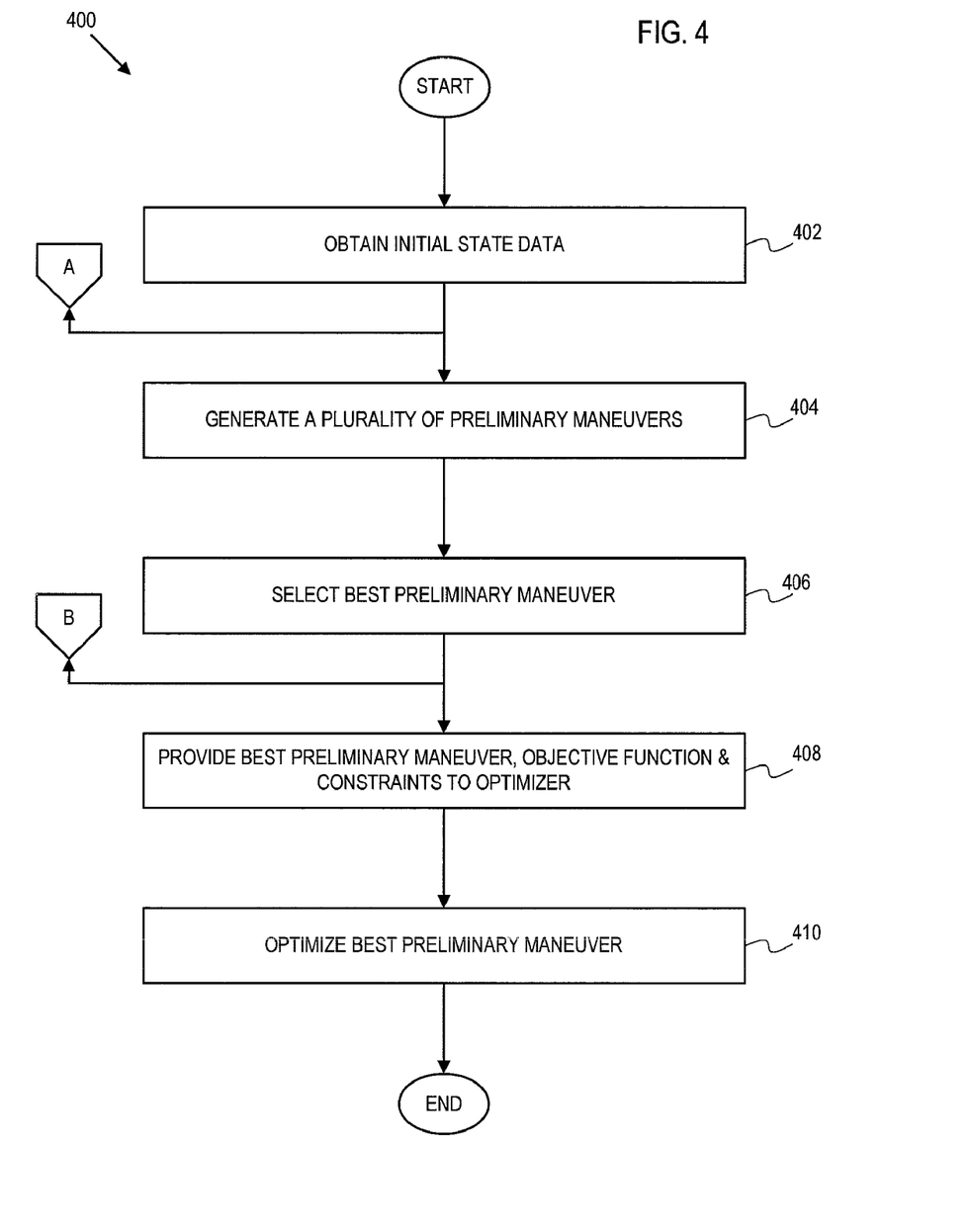
FIG. 4 is a flow chart of a method of determining a collision avoidance maneuver, according to an embodiment.

If a conjunction is analyzed and it is concluded that a collision avoidance maneuver needs to be determined and executed per thresholds on the previously defined quantities, method 400 of FIG. 4 may be used to determine a collision avoidance maneuver that is optimized to minimize the magnitude of one or more of its maneuver parameters while assuring that the maneuver will satisfy its constraints. For example, method 400 may be used to determine a collision avoidance maneuver that has a minimum delta velocity vector ($\Delta v$) magnitude or a minimum burn duration which allows the maneuver to meet minimum miss distance and probability of collision constraints.

Method 400 begins at step 402, wherein initial state data for the first object 100 and the second object 102 is obtained. As was stated above, initial state data may include positions 104 and 106 and their associated covariance matrices, and velocities 108 and 110.

In step 404, a plurality of preliminary maneuvers are generated. In an embodiment, each preliminary maneuver has an epoch and a delta velocity vector ($\Delta v$). In another embodiment, each preliminary maneuver has a start epoch, a thrust direction, and a burn duration. In an embodiment, the magnitude of the delta velocity vector ($\Delta v$) is the smallest of a predetermined set of discrete delta velocity vector ($\Delta v$) magnitudes that allows the preliminary maneuver to meet a first set constraints. In another embodiment, the burn duration is the smallest of a predetermined set of discrete burn durations that allows the preliminary maneuver to meet the first set of constraints. The first set of constraints may include a requirement that the minimum miss distance exceed a first minimum miss distance constraint, and a requirement that the probability of collision not exceed a first probability of collision constraint.

With respect to the above discussion of various embodiments for determining nominal probability ($P_{nom}$) and maximum probability ($P_{max}$), it is understood and appreciated that in at least one embodiment, the first set of constraints include determining the values of a minimum miss distance and nominal probability ($P_{nom}$). More specifically, in at least one embodiment, in determining the first set of constraints the relative covariance ($C_{rel}$) is thought of as a constant formed from the two component covariances, each of which is also treated as a constant. Moreover, in at least one embodiment $C_{rel}$ is determined in accordance with Equation 3 as described above.

In at least one alternative embodiment, the first set of constraints include determining the values of a minimum miss distance and maximum probability ($P_{max}$). More specifically, in at least one embodiment, in determining the first set of constraints the relative covariance ($C_{rel}$) is permitted to change in one dimension as a function of scale factor K over the interval of [$K_a$, $K_b$]. Moreover, in at least one embodiment $C_{rel}$ is determined in accordance with Equation 11 as described above.

In yet at least one other alternative embodiment, the first set of constraints include determining the values of a minimum miss distance and maximum probability ($P_{max}$). More specifically, in at least one embodiment, in determining the first set of constraints the relative covariance ($C_{rel}$) is permitted to vary as a function of two variables which are scales of the component covariances. Moreover, in at least one embodiment $C_{rel}$ is determined in accordance with Equation 12 as described above.

In other words, it is understood and appreciated that the first set of constraints includes a first probability of collision that is determined in a first instance as a nominal probability determined by evaluating a relative covariance as a constant formed from a component covariance of the first object and a component covariance of the second object; in a second instance as a maximum probability determined by evaluating a relative covariance along one dimension over a defined interval to scale against a component covariance of the first object and a component covariance of the second object; and in a third instance as a maximum probability determined by evaluating a relative covariance as a function of two variables, a first variable as a scale against a component covariance of the first object and a second variable as a scale against a component covariance of the second object.

In step 406, one of the preliminary maneuvers generated in step 404 is selected according to a selection criteria and designated as the best preliminary maneuver. The selection criteria is chosen to optimize one or more of the maneuver's parameters. For example, the selection criteria may specify that the preliminary maneuver with the smallest delta velocity vector ($\Delta v$) magnitude or the preliminary maneuver with the shortest burn duration be selected.

In steps 408 and 410, the best preliminary maneuver is optimized according to an objective function by a numeric optimizer subsystem. For example, the numeric optimizer subsystem may optimize a best preliminary maneuver having parameters including an epoch and a delta velocity vector ($\Delta v$) such that the delta velocity vector ($\Delta v$) has about a smallest magnitude that allows the maneuver to meet a second set of constraints. As another example, the numeric optimizer subsystem may optimize a maneuver having parameters including a start epoch, a thrust direction, and a burn duration such that the maneuver has about a shortest burn duration that allows the maneuver to satisfy the second set of constraints.

Steps 408 and 410 may be executed as follows. In step 408, the best preliminary maneuver, an objective function, and the second set of constraints are provided to the numeric optimizer subsystem. The objective function includes one or more objectives of the optimization. In an embodiment, the objective function defines one or more of the maneuver's parameters that are to be optimized and specifies how the parameters are to be optimized. For example, the objective function may define the magnitude of a maneuver's delta velocity vector ($\Delta v$) and specify that the magnitude is to be minimized. As another example, the objective function may define a maneuver's burn duration and specify that the duration is to be minimized.

The objective function further includes initial state data and expressions defining parameters constrained by the second set of constraints for use by the numeric optimizer subsystem. For example, the objective function may include expressions such as Equation 1, which provides the numeric optimizer subsystem a method to determine MMD 120, and/or Equation 10, which allows the numeric optimizer subsystem to determine $P_C$.

In an embodiment, the second set of constraints includes a second minimum miss distance constraint, a second probability of collision constraint, and a maneuver time window. As described above with respect to the first set of constraints, it is understood and appreciated that in at least one embodiment, the second set of constraints include determining the values of a minimum miss distance and a nominal probability ($P_{nom}$) of collision. More specifically, in at least one embodiment, in determining the second set of constraints the relative covariance ($C_{rel}$) is thought of as a constant formed from the two component covariances, each of which is also treated as a constant. Moreover, in at least one embodiment $C_{rel}$ is determined in accordance with Equation 3 as described above.

In at least one alternative embodiment, the second set of constraints include determining the values of a minimum miss distance and a maximum probability ($P_{nom}$). More specifically, in at least one embodiment, in determining the second set of constraints the relative covariance ($C_{rel}$) is permitted to change in one dimension as a function of scale factor K over the interval of [$K_a$, $K_b$]. Moreover, in at least one embodiment $C_{rel}$ is determined in accordance with Equation 11 as described above.

In yet at least one other alternative embodiment, the second set of constraints include determining the values of a minimum miss distance and maximum probability ($P_{max}$). More specifically, in at least one embodiment, in determining the second set of constraints the relative covariance ($C_{rel}$) is permitted to vary as a function of two variables which are scales of the component covariances. Moreover, in at least one embodiment $C_{rel}$ is determined in accordance with Equation 12 as described above.

In other words, it is understood and appreciated that the second set of constraints includes a second probability of collision that is determined in a first instance as a nominal probability determined by evaluating a relative covariance as a constant formed from a component covariance of the first object and a component covariance of the second object, in a second instance as a maximum probability determined by evaluating a relative covariance along one dimension over a defined interval to scale against a component covariance of the first object and a component covariance of the second object; and in a third instance as a maximum probability determined by evaluating a relative covariance as a function of two variables, a first variable as a scale against a component covariance of the first object and a second variable as a scale against a component covariance of the second object.

The second minimum miss distance constraint may be the same as the first minimum miss distance constraint of step 404, and the second probability of collision constraint may be the same as the first probability of collision constraint of step 404. The maneuver time window is a time period wherein it is acceptable to execute a maneuver. For example, if the maneuver is going to be executed by a satellite, the maneuver time window may specify that a maneuver may be executed solely when the satellite is not recording important data.

The second set of constraints also includes a requirement that a relative dot product value be zero. The relative dot product is the dot product of $r_{rel}$ and $v_{rel}$. As stated above, vector $r_{rel}$ represents the difference in the objects' positions at the TCA, and $v_{rel}$ represents the difference in the objects' velocities at the TCA. The relative dot product will be zero if the minimum miss distance is determined at the TCA. Consequently, constraining the relative dot product to zero insures that the numeric optimizer subsystem evaluates the second set of constraints at the TCA.

The second set of constraints also includes a requirement that a difference consisting of the TCA minus the maneuver execution time (i.e., the epoch or start epoch value) be positive. Such constraint insures that numeric optimizer subsystem does not provide a mathematically possible, but ineffective, final maneuver that is to be executed after the TCA. A maneuver that is to be executed after the TCA will be unable to reduce the likelihood of a collision in a conjunction because the potential collision will have occurred before the maneuver is executed.

In step 410, the numeric optimizer subsystem optimizes the best preliminary maneuver according to the objective specified in the objective function while adhering to the second set of constraints. The numeric optimizer subsystem uses the best preliminary maneuver as a starting point, and optimizes the maneuver's parameters such that the objective function is minimized. As stated above, constraining the relative dot product to zero insures that the second set of constraints are evaluated at the TCA.

The optimized best preliminary maneuver from the numeric optimizer subsystem is referred to as a final maneuver. The final maneuver may then be executed by the first object 100 such that the likelihood of it colliding with the second object 102 is within an acceptable margin as specified by the second set of constraints (e.g., second minimum miss distance constraint and/or second probability of collision constraint).

In additional embodiments, the objective function may require that the final maneuver have the same epoch or start epoch value as the best preliminary maneuver. Furthermore, in an embodiment, the objective function may constrain one or two of the components of the final maneuver's direction to preclude out of track or out of plane maneuvers. An out of track maneuver is a maneuver in which the delta velocity vector ($\Delta v$) or the thrust direction is not co-aligned with either the object's velocity or anti-velocity vector. An out of plane maneuver is a maneuver in which the delta velocity vector ($\Delta v$) or the thrust direction is not normal to the object's specific angular momentum vector, wherein the specific angular momentum vector is normal to the object's instantaneous position and velocity vectors. Velocity, anti-velocity, specific angular momentum, and position vectors are discussed in more detail below with respect to FIG. 6.

Figure 5:
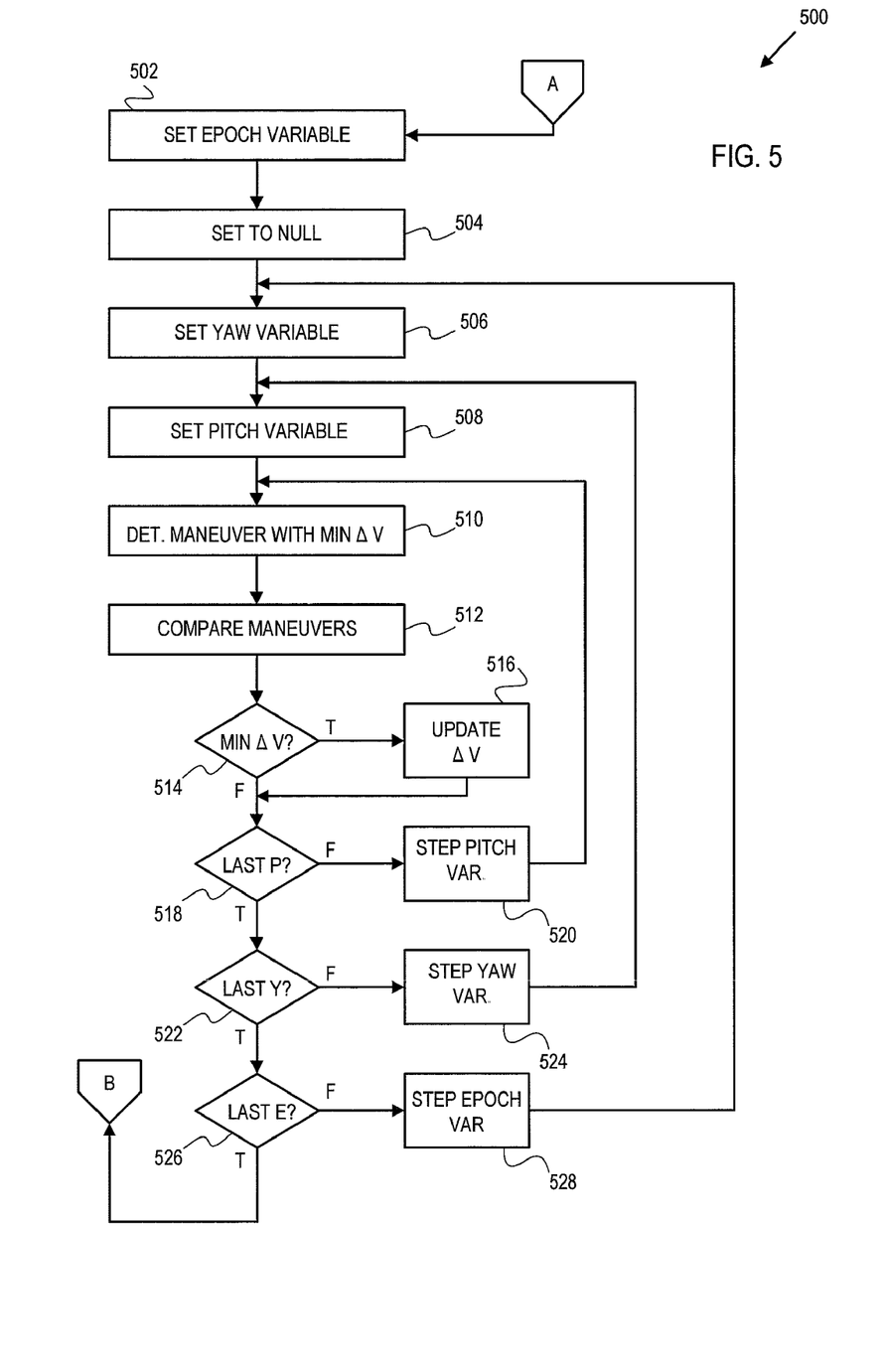
FIG. 5 is a flow chart of a method of generating a plurality of preliminary maneuvers and selecting the best preliminary maneuver, wherein each preliminary maneuver has parameters including an epoch and delta velocity vector, according to an embodiment.

The numeric optimizer subsystem may be any subsystem that is operable to optimize a function while adhering to a set of constraints. In at least one embodiment, the numeric optimizer subsystem is the NLP2 algorithm from Aerospace Corporation, as identified in Aerospace Report Number TOR-0089(4464-06)-1. FIG. 5 is a flow chart of method 500 for generating a plurality of preliminary maneuvers and for selecting the best preliminary maneuver, wherein each preliminary maneuver has parameters including an epoch and a delta velocity vector ($\Delta v$). In an embodiment, method 500 may be used to implement steps 404 and 406 of FIG. 4, as indicated by off page references A and B.

Method 500 determines a preliminary maneuver for each of a plurality of points in a grid. Each point is a unique combination of predetermined maneuver parameters, and the plurality of points is collectively referred to as a grid. Each point initially does not contain sufficient maneuver parameters to completely define a maneuver; each point is missing a delta velocity vector ($\Delta v$) magnitude. Method 500 determines for each point a smallest member of a predetermined set of delta velocity vector ($\Delta v$) magnitudes which allows the resulting maneuver to satisfy the first set of constraints as a feasible input to the numeric optimizer subsystem.

Stated simply, method 500 associates a delta velocity vector ($\Delta v$) magnitude with each point to create a preliminary maneuver for each point. For example, each point may initially have an epoch value, a pitch value, a yaw value, and a general maneuver direction. Method 500 associates a delta velocity vector ($\Delta v$) magnitude with the point such that the point completely defines a maneuver having parameters including an epoch and a delta velocity vector ($\Delta v$), wherein the delta velocity vector ($\Delta v$) is defined by the pitch value, the yaw value, the general maneuver direction, and the delta velocity vector ($\Delta v$) magnitude.

The boundaries of the grid and the number of points in the grid are determined by the characteristics and the quantity of the predetermined maneuver parameters. Each point includes one value of each category of predetermined maneuver parameters. In method 500, each point is a unique combination of one epoch value, one pitch value, one yaw value, and one general maneuver direction. As an example, consider an application having 10 allowable epoch values, 5 allowable pitch values, 5 allowable yaw values, and 2 general maneuver directions. This application would have a grid of 500 points, because each point includes an unique combination of one value of each category of predetermined maneuver parameters (i.e., epoch, pitch, yaw, and general maneuver direction).

Figure 6:
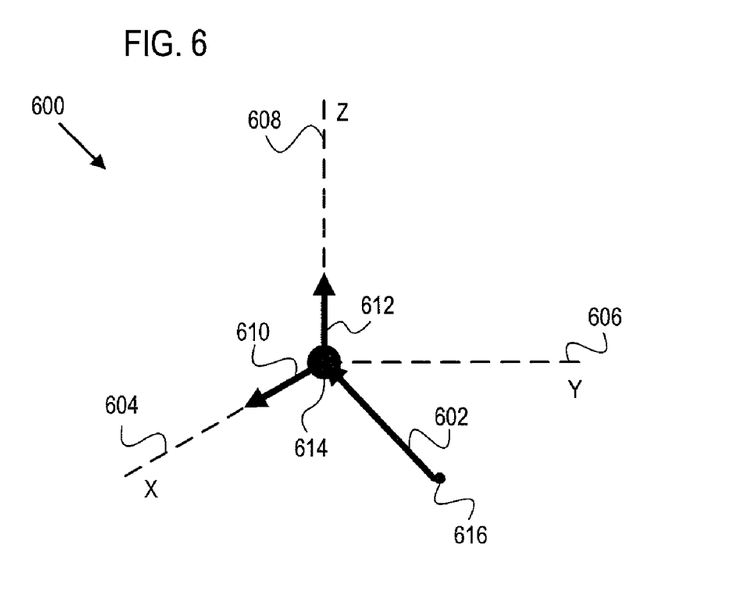
FIG. 6 is a side perspective view of rotating, orbit normal coordinate system.

Pitch, yaw, and the general maneuver direction may be visualized by referring to FIG. 6, which is a side perspective view of rotating, orbit normal coordinate system 600 at a given instance in time. In coordinate system 600, object 614, which is represented by a dot, is traveling with a velocity represented by velocity vector 610. Object 614 may be any object operable to execute a collision avoidance maneuver. For example, object 614 may be a satellite.

Coordinate system 600 is defined relative to object 614 and the Earth's center 616. The origin of coordinate system 600 corresponds to the instantaneous position of object 614. Position vector 602 represents the distance from the Earth's center to object 614 and the origin of coordinate system 600.

Specific angular momentum vector 612 is normal to both velocity vector 610 and position vector 602. X-axis 604 is aligned with velocity vector 610; z-axis 608 is aligned with specific angular momentum vector 612, and y-axis 606 is normal to both x-axis 604 and z-axis 608.

Pitch and yaw define a unit pointing vector relative to velocity vector 610. The pointing vector along with the general maneuver direction determine a directional parameter of a maneuver. For example, if a maneuver's parameters include an epoch and delta velocity vector ($\Delta v$) as in method 500, the unit pointing vector along with the general maneuver direction determine the direction of the delta velocity vector ($\Delta v$). As another example, if a maneuver's parameters include a start epoch, thrust direction and burn duration, as discussed with respect to method 600 below, the unit pointing vector along with the general maneuver direction determine the thrust direction.

Pitch is the angle of the unit pointing vector with respect to x-axis 604 in the x-y plane; pitch is positive if the angle is in the direction of the positive y-axis 606. Yaw is the angle of the pointing vector with respect to the x-y plane; yaw is positive if the angle is in the direction of the positive z-axis 608.

The general maneuver direction may be posigrade or retrograde. The general maneuver direction is posigrade if the unit pointing vector is defined relative to velocity vector 610; conversely, the general maneuver direction is retrograde if the unit pointing vector is defined relative to the negative value of velocity vector 610, which is commonly referred to as the anti-velocity of object 614.

Referring back to FIG. 5, method 500 begins with step 502 wherein a current epoch variable is set to the first of a predetermined set of epoch values. The current epoch variable houses the epoch value that is to be used for current preliminary maneuver calculations.

In step 504, a best preliminary maneuver record is set to a null value. The best preliminary maneuver record houses the identity and parameters of a preliminary maneuver currently known to have a delta velocity vector ($\Delta v$) with a smallest magnitude, which is referred to as the best preliminary maneuver.

In step 506, the current yaw variable is set to the first of a predetermined set of yaw values. For example, the predetermined set of yaw values may consist of angles ranging from negative five degrees to five degrees in one degree increments. The current yaw variable houses the yaw value that is to be used for current preliminary maneuver calculations.

In step 508, the current pitch variable is set to the first value of a predetermined angles ranging from negative five degrees to five degrees in one degree increments. The current pitch variable houses the pitch value that is to be used for current preliminary maneuver calculations.

In step 510, a posigrade preliminary maneuver and a retrograde preliminary maneuver are determined. Both preliminary maneuvers have a pitch value equal to that housed in the current pitch variable, a yaw value equal to that housed in the current yaw variable, and an epoch value housed in the current epoch variable. Both preliminary maneuvers have minimum values of the predetermined set of delta velocity vector ($\Delta v$) magnitudes that allow the maneuver to satisfy the first set of constraints.

The delta velocity vector ($\Delta v$) magnitude for posigrade and retrograde preliminary maneuvers are each determined in step 510 as follows. The delta velocity vector ($\Delta v$) magnitude is initially set to a predetermined minimum value, the maneuver is simulated, and the resulting orbit is propagated to an updated TCA. The parameters constrained by the first set of constraints are then evaluated. For example, MMD 120 may be determined using Equation 1, and $P_C$ may be determined using Equation 10. If the maneuver does not adhere to the first set of constraints, the delta velocity vector ($\Delta v$) magnitude is incremented to the next value of the predetermined set of delta velocity vector ($\Delta v$) magnitudes. The parameters constrained by the first set of constraints are then re-evaluated. The process of incrementing the delta velocity vector ($\Delta v$) magnitude and re-evaluating the constrained parameters is repeated until the maneuver adheres to the first set of constraints or until the delta velocity vector ($\Delta v$) magnitude has reached a predetermined maximum value.

In step 512, the delta velocity vector ($\Delta v$) magnitude of the posigrade preliminary maneuver and the retrograde preliminary maneuver (determined in step 510) are compared. The preliminary maneuver having the larger delta velocity vector ($\Delta v$) magnitude is discarded.

In decision 514 the delta velocity vector ($\Delta v$) magnitude of the preliminary maneuver determined in step 510 and not discarded in step 512 ("current preliminary maneuver") is compared to the delta velocity vector ($\Delta v$) magnitude of the best preliminary maneuver. (As was stated above, the best preliminary maneuver is housed in the best preliminary maneuver record.) If the current preliminary maneuver's delta velocity vector ($\Delta v$) magnitude is less than that of the best preliminary maneuver, or if the best preliminary entry in the best preliminary maneuver record is replaced with the current preliminary maneuver in step 516. If the result of decision 514 is false, method 500 proceeds directly to decision 518.

Decision 518 determines whether the current pitch value is the last of the predetermined set of pitch values. If the result of decision 518 is true, method 500 proceeds to decision 522. If the result of decision 518 is false, method 500 proceeds to step 520 wherein the current pitch value is incremented to the next pitch value in the predetermined set of pitch values. Method 500 returns to step 510 from step 520.

Decision 522 determines whether the current yaw value is the last of the predetermined set of yaw values. If the result of decision 522 is true, method 500 proceeds to decision 526. Conversely, if the result of decision 522 is false, method 500 proceeds to step 524 wherein the current yaw value is incremented to the next yaw value in the predetermined set of yaw values. Method 500 returns to step 508 from step 524.

Decision 526 determines whether the current epoch value is the last of the predetermined set of epoch values. If the result of decision 526 is true, method 500 is complete and terminates. In an embodiment, method 500 proceeds to step 408 of method 400 after terminating.

If the result of decision 526 is false, method 500 proceeds to step 528 wherein the current epoch variable value is incremented to the next epoch value in the predetermined set of epoch values. Method 500 returns to step 506 from step 528.

Figure 7:
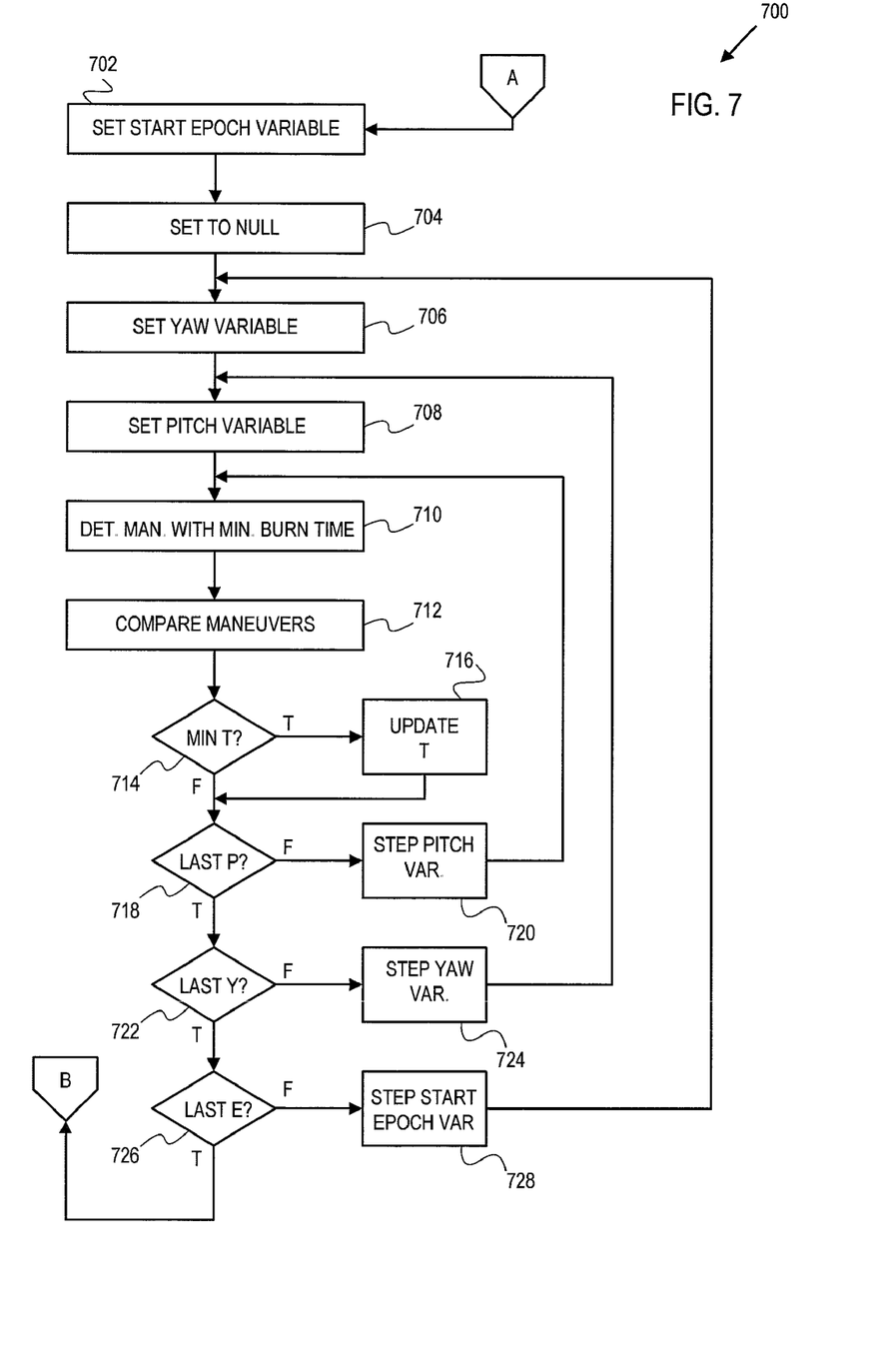
FIG. 7 is a flow chart of a method of generating a plurality of preliminary maneuvers and selecting the best preliminary maneuver, wherein each preliminary maneuver has parameters including a start epoch, a thrust direction, and a burn duration, according to an embodiment.

FIG. 7 is a flow chart of method 700 for generating a plurality of preliminary maneuvers and for selecting the best preliminary maneuver, wherein each preliminary maneuver has parameters including a start epoch, a thrust direction, and a burn duration. In an embodiment, method 700 may be used to implement steps 404 and 406 of FIG. 4, as indicated by off page references A and B.

Method 700 determines a preliminary maneuver for each of a plurality of points in a grid. Each point is a unique combination of predetermined maneuver parameters, and the plurality of points is collectively referred to as a grid. Each point initially does not contain sufficient maneuver parameters to completely define a maneuver; each point is missing a burn duration. Method 700 determines for each point a smallest member of a predetermined set of burn durations which allow the resulting maneuver to satisfy the first set of constraints. Stated simply, method 700 associates a burn duration with each point to create a preliminary maneuver for each point. For example, each point may initially have a start epoch value, a pitch value, a yaw value, and a general maneuver direction. Method 700 associates a burn duration value such that the point completely defines a maneuver having parameters including a start epoch value, a thrust direction, and a burn duration value, wherein the thrust direction is defined by the pitch value, the yaw value, and the general maneuver direction.

The boundaries of the grid and the number of points in the grid are determined by the characteristics and the quantity of the predetermined maneuver parameters. Each point includes one value of each category of predetermined maneuver parameters. In method 700, each point is a unique combination of one start epoch value, one pitch value, one yaw value, and one general maneuver direction. As an example, consider an application having 10 allowable start epoch values, 5 allowable pitch values, 5 allowable yaw values, and 2 general maneuver directions. This application would have a grid of 500 points, because each point includes an unique combination of one value of each category of predetermined maneuver parameters (i.e., start epoch, pitch, yaw, and general maneuver direction).

Method 700 begins with step 702 wherein a current start epoch variable is set to the first of a predetermined set of start epoch values. The current start epoch variable houses the start epoch value that is to be used for current preliminary maneuver calculations.

In step 704, a best preliminary maneuver record is set to a null value. The best preliminary maneuver record houses the identity and parameters of a preliminary maneuver currently known to have the shortest burn duration, which is referred to as the best preliminary maneuver.

In step 706, the current yaw variable is set to the first of a predetermined set of yaw values. For example, the predetermined set of yaw values may consist of angles ranging from negative five degrees to five degrees in one degree increments. The current yaw variable houses the yaw value that is to be used for current preliminary maneuver calculations.

In step 708, the current pitch variable is set to the first value of a predetermined set of pitch values. For example, the predetermined set of pitch values may consist of angles ranging from negative five degrees to five degrees in one degree increments. The current pitch variable houses the pitch value that is to be used for current preliminary maneuver calculations.

In step 710, a posigrade preliminary maneuver and a retrograde preliminary maneuver are determined. Both preliminary maneuvers have a pitch value equal to that housed in the current pitch variable, a yaw value equal to that housed in the current yaw variable, and a start epoch value equal to that housed in the current start epoch variable. Both preliminary maneuvers have minimum values of the predetermined set of burn durations that allow the maneuver to satisfy the first set of constraints.

The burn durations for posigrade and retrograde preliminary maneuvers are each determined in step 710 as follows. The burn duration is initially set to a predetermined minimum value, the maneuver is simulated, and the resulting orbit is propagated to an updated TCA. The parameters constrained by the first set of constraints are then evaluated. For example, MMD 120 may be determined using Equation 1, and $P_C$ may be determined using Equation 10. If the maneuver does not adhere to the first set of constraints, the burn duration is incremented to the next value of the predetermined set of burn durations. The parameters constrained by the first set of constraints are then re-evaluated. The process of incrementing the burn duration and re-evaluating the constrained parameters is repeated until the maneuver adheres to the first set of constraints or until the burn duration has reached a predetermined maximum value.

In step 712, the burn duration of the posigrade preliminary maneuver and the retrograde preliminary maneuver (determined in step 710) are compared. The preliminary maneuver having the larger burn duration is discarded.

In decision 714 the burn duration of the preliminary maneuver determined in step 710 and not discarded in step 712 ("current preliminary maneuver") is compared to the burn duration of the best preliminary maneuver. (As was stated above, the best preliminary maneuver is housed in the best preliminary maneuver record.) If the current preliminary maneuver's burn duration is less than that of the best preliminary maneuver, or if the best preliminary maneuver is null, the result of decision 714 is true. If the result of decision 714 is true, the entry in the best preliminary maneuver record is replaced with the current preliminary maneuver in step 716. If the result of decision 714 is false, method 700 proceeds directly to decision 718.

Decision 718 determines whether the current pitch value is the last of the predetermined set of pitch values. If the result of decision 718 is true, method 700 proceeds to decision 722. If the result of decision 718 is false, method 700 proceeds to step 720 wherein the current pitch value is incremented to the next pitch value in the predetermined set of pitch values. Method 700 returns to step 710 from step 720.

Decision 722 determines whether the current yaw value is the last of the predetermined set of yaw values. If the result of decision 722 is true, method 700 proceeds to decision 726. Conversely, if the result of decision 722 is false, method 700 proceeds to step 724 wherein the current yaw value is incremented to the next yaw value in the predetermined set of yaw values. Method 700 returns to step 708 from step 724.

Decision 726 determines whether the current start epoch value is the last of the predetermined set of start epoch values. If the result of decision 726 is true, method 700 is complete and terminates. In an embodiment, method 700 proceeds to step 408 of method 400 after terminating.

If the result of decision 726 is false, method 700 proceeds to step 728 wherein the current epoch value is incremented to the next start epoch value in the predetermined set of start epoch values. Method 700 returns to step 706 from step 728.

Figure 8:
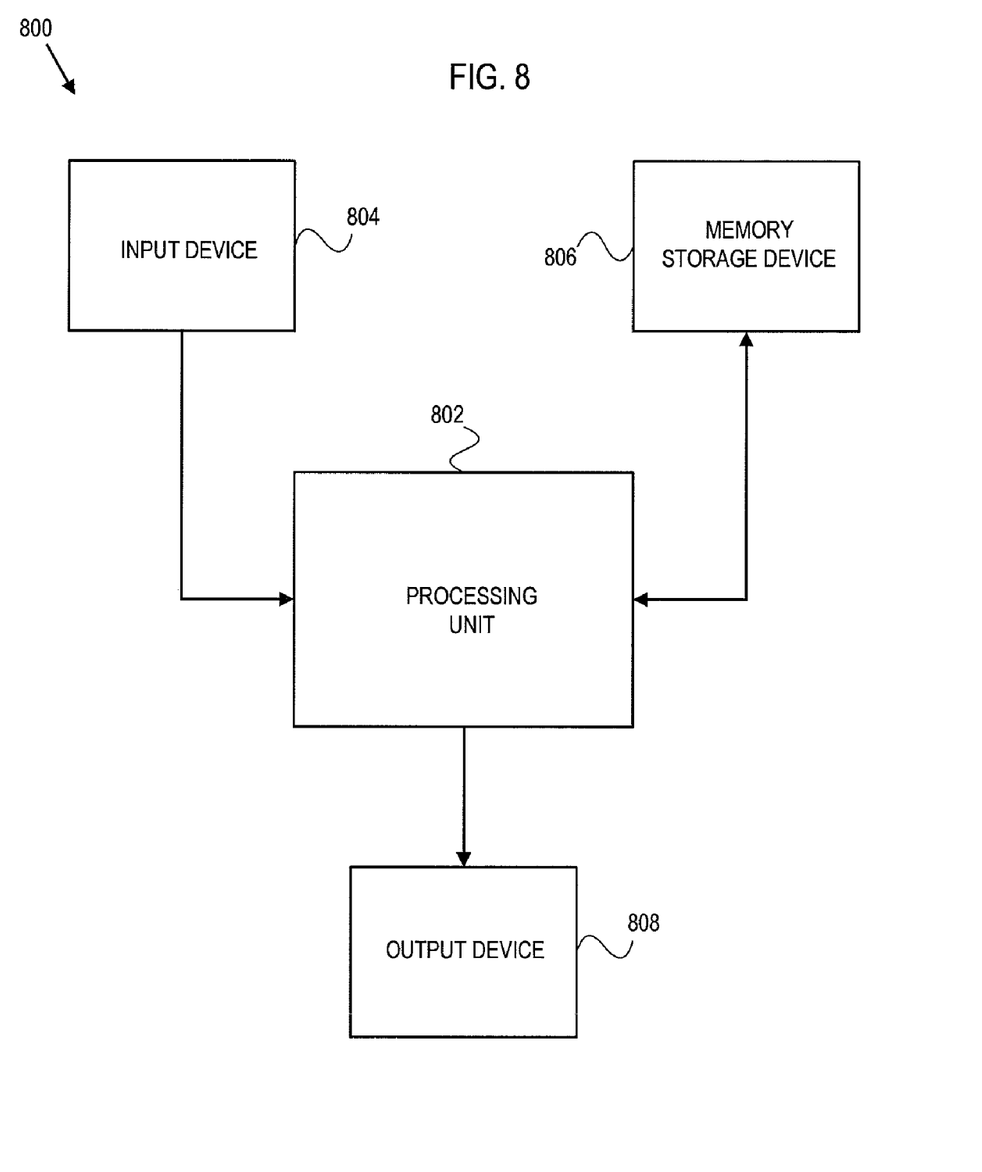
FIG. 8 schematically illustrates a computer system for determining a collision avoidance maneuver, according to an embodiment.

The methods of determining a collision avoidance maneuver, such as methods 400, 500 and/or 700, may be executed on computer system 800 of FIG. 8. Computer system 800 includes processing unit 802, input device 804, memory storage device 806, and output device 808.

Processing unit 802 executes instructions and processes data received by computer system 800. Processing unit 802 may be a general purpose or custom designed central processing unit, such as a microprocessor. Additionally, processing unit 802 may represent a plurality of central processing units. Processing unit 802 is operable to execute method 400, 500 and/or method 700.

Input device 804 is coupled to processing unit 802. Input device 804 provides a means for inputting data or instructions, such as initial state data, constraint data, an objective function, and instructions to execute methods 400, 500 and/or 700, to processing unit 802. Input device 804 may be any acceptable device that allows data to be transferred to computer system 800. For example, input device 804 may be a keyboard, a pointing device, a network interface device, a modem, a magnetic disk or tape drive, and/or an optical drive.

Memory storage device 806 is coupled to processing unit 802. Memory storage device 806 provides a means for processing unit 802 to store data or instructions for later use. Memory storage device 806 may consist or any one or more apparatuses operable to store data for use by processing unit 802. For example, memory storage device 806 may consist of random access memory.

Output device 808 is coupled to processing unit 802. Output device 808 provides a means for processing unit 802 to output data. Output device 808 may be any acceptable device that allows data to be transferred out of computer system 800. For example, output device 808 may be a monitor, a printer, a network interface device, a modem, a magnetic disk or tape drive, and/or an optical drive. Output device 808 may be operable to output a definition of a preliminary maneuver and/or a final maneuver.

The methods of determining a collision avoidance maneuver, such as methods 400, 500, and/or 700, may be embodied in instructions of a software product. For example, a software product may include the following routines: (1) an input routine for obtaining initial state data, (2) a preliminary maneuver generating routine for generating a plurality of preliminary maneuvers, (3) a selection routine for selecting a best preliminary maneuver from the plurality of preliminary maneuvers, and (4) an optimizing routine for optimizing the best preliminary maneuver according to an objective function to provide a final maneuver.

The software product may be stored on computer-readable media, such as a magnetic or optical disk. The software product may be executed on a computer system, such as computer system 800 of FIG. 8. In an embodiment, multiple instantiations of the routines of the software product are executed substantially concurrently.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method of determining a collision avoidance maneuver, comprising:
    obtaining initial state data including initial state data for a first object and a second object;
    generating a plurality of preliminary maneuvers satisfying a first set of constraints using the initial state data;
    selecting a best preliminary maneuver from the plurality of preliminary maneuvers; and
    optimizing the best preliminary maneuver according to an objective function to provide a final maneuver, the optimization adhering to a provided second set of constraints.

2. The method of claim 1, wherein each preliminary maneuver has parameters further comprising an epoch and a delta velocity vector.

3. The method of claim 2, wherein selecting a best preliminary maneuver includes selecting a preliminary maneuver having the smallest delta velocity vector magnitude.

4. The method of claim 1, wherein each preliminary maneuver has parameters further comprising a start epoch, a thrust direction, and a burn duration.

5. The method of claim 4, wherein selecting a best preliminary maneuver includes selecting a preliminary maneuver having a shortest burn duration.

6. The method of claim 1, wherein the final maneuver has parameters further comprising an epoch and a delta velocity vector.

7. The method of claim 6, wherein the objective is to minimize a magnitude of the delta velocity vector.

8. The method of claim 1, wherein the final maneuver has parameters further comprising a start epoch, a thrust direction, and a burn duration.

9. The method of claim 8, wherein the objective is to minimize the burn duration.

10. The method of claim 1, wherein optimizing the best preliminary maneuver includes using a numerical optimizer subsystem.

11. The method of claim 1, wherein the initial state data further comprises:
    a first state vector associated with the first object and a second state vector associated with the second object; and
    a first covariance matrix associated with a position of the first object and a second covariance matrix associated with a position of the second object.

12. The method of claim 1, wherein the first set of constraints further comprises a first minimum miss distance constraint and a first probability of collision constraint.

13. The method of claim 12, wherein the first probability is a nominal probability determined by evaluating a relative covariance as a constant formed from a component covariance of the first object and a component covariance of the second object.

14. The method of claim 12, wherein the first probability is a maximum probability determined by evaluating a relative covariance along one dimension over a defined interval to scale against a component covariance of the first object and a component covariance of the second object.

15. The method of claim 12, wherein the first probability is a maximum probability determined by evaluating a relative covariance as a function of two variables, a first variable as a scale against a component covariance of the first object and a second variable as a scale against a component covariance of the second object.

16. The method of claim 1, wherein the second set of constraints further comprises a second minimum miss distance constraint, a second probability of collision constraint, and a maneuver time window.

17. The method of claim 16, wherein the second probability is a nominal probability determined by evaluating a relative covariance as a constant formed from a component covariance of the first object and a component covariance of the second object.

18. The method of claim 16, wherein the second probability is a maximum probability determined by evaluating a relative covariance along one dimension over a defined interval to scale against a component covariance of the first object and a component covariance of the second object.

19. The method of claim 16, wherein the second probability is a maximum probability determined by evaluating a relative covariance as a function of two variables, a first variable as a scale against a component covariance of the first object and a second variable as a scale against a component covariance of the second object.

20. The method of claim 16, wherein the second set of constraints further comprises a relative dot product value and a requirement that a difference consisting of a final maneuver execution time minus a time of closest approach be a positive value.

21. The method of claim 1, wherein the objective function specifies an optimizing objective.

22. The method of claim 1, wherein the objective function relates the second set of constraints to the final maneuver.

23. The method of claim 1 further comprising:
analyzing a conjunction to determine a minimum miss distance and a probability of collision; and
determining the collision avoidance maneuver only if the minimum miss distance is less than a first threshold or if the probability of collision exceeds a second threshold.

24. A method of determining a collision avoidance maneuver, comprising:
obtaining initial state data including position data, position covariance data, and velocity data for a first object and a second object;
determining a plurality of preliminary maneuvers, including the steps of:
determining a plurality of points, each point having an unique combination of maneuver parameters including an epoch value, a yaw value, a pitch value, and a general maneuver direction;
creating a preliminary maneuver from each point, each preliminary maneuver initially having a predetermined minimum delta velocity vector magnitude;
simulating each preliminary maneuver and evaluating parameters constrained by a first set of constraints; and
increasing the delta velocity vector magnitude of each preliminary maneuver in discrete steps until the preliminary maneuver adheres to the first set of constraints;
designating a preliminary maneuver having a smallest delta velocity vector magnitude as a best preliminary maneuver; and
optimizing the best preliminary maneuver according to an objective function to provide a final maneuver using a numerical optimizer subsystem, the final maneuver having about a smallest delta velocity vector magnitude allowing the final maneuver to adhere to a second set of constraints.

25. The method of claim 24, wherein the first set of constraints includes a first probability of collision determined;

in a first instance as a nominal probability determined by evaluating a relative covariance as a constant formed from a component covariance of the first object and a component covariance of the second object;

in a second instance as a maximum probability determined by evaluating a relative covariance along one dimension over a defined interval to scale against a component covariance of the first object and a component covariance of the second object; and in a third instance as a maximum probability determined by evaluating a relative covariance as a function of two variables, a first variable as a scale against a component covariance of the first object and a second variable as a scale against a component covariance of the second object; and the second set of constraints includes a second probability of collision determined;

in a first instance as a nominal probability determined by evaluating a relative covariance as a constant formed from a component covariance of the first object and a component covariance of the second object;

in a second instance as a maximum probability determined by evaluating a relative covariance along one dimension over a defined interval to scale against a component covariance of the first object and a component covariance of the second object; and in a third instance as a maximum probability determined by evaluating a relative covariance as a function of two variables, a first variable as a scale against a component covariance of the first object and a second variable as a scale against a component covariance of the second object.

26. A method of determining a collision avoidance maneuver, comprising:
obtaining initial state data including position data, position covariance data, and velocity data for a first object and a second object;
determining a plurality of preliminary maneuvers, including the steps of:
determining a plurality of points, each point having an unique combination of maneuver parameters including a start epoch value, a yaw value, a pitch value, and a general maneuver direction;
creating a preliminary maneuver from each point, each preliminary maneuver initially having a predetermined minimum burn duration;
simulating each preliminary maneuver and evaluating parameters constrained by a first set of constraints; and
increasing the burn duration of each preliminary maneuver in discrete steps until the preliminary maneuver adheres to the first set of constraints;
designating a preliminary maneuver having a shortest burn duration as a best preliminary maneuver; and
optimizing the best preliminary maneuver according to an objective function to provide a final maneuver using a numerical optimizer subsystem, the final maneuver having about a shortest burn duration allowing the final maneuver to adhere to a second set of constraints.

27. The method of claim 26, wherein the first set of constraints includes a first probability of collision determined;
in a first instance as a nominal probability determined by evaluating a relative covariance as a constant formed from a component covariance of the first object and a component covariance of the second object;

in a second instance as a maximum probability determined by evaluating a relative covariance along one dimension over a defined interval to scale against a component covariance of the first object and a component covariance of the second object; and in a third instance as a maximum probability determined by evaluating a relative covariance as a function of two variables, a first variable as a scale against a component covariance of the first object and a second variable as a scale against a component covariance of the second object; and the second set of constraints includes a second probability of collision determined;

in a first instance as a nominal probability determined by evaluating a relative covariance as a constant formed from a component covariance of the first object and a component covariance of the second object;

in a second instance as a maximum probability determined by evaluating a relative covariance along one dimension over a defined interval to scale against a component covariance of the first object and a component covariance of the second object; and in a third instance as a maximum probability determined by evaluating a relative covariance as a function of two variables, a first variable as a scale against a component covariance of the first object and a second variable as a scale against a component covariance of the second object.

28. A computer system for determining a collision avoidance maneuver, comprising:

a processing unit;

a memory storage device coupled to the processing unit;

an input device coupled to the processing unit;

an output device coupled to the processing unit;

the processing unit being operative to:

obtain initial state data including initial state data for a first object and a second object;

generate a plurality of preliminary maneuvers satisfying a first set of constraints using the initial state data;

select a best preliminary maneuver from the plurality of preliminary maneuvers; and optimize the best preliminary maneuver according to an objective function to provide a final maneuver, the optimization adhering to a provided second set of constraints.

29. A software product comprising instructions, stored on computer-readable media, wherein the instructions, when executed by a computer, perform steps for determining a collision avoidance maneuver, comprising:

an input routine operatively associated with an input device for obtaining initial state data including initial state data for a first object and a second object;

a preliminary maneuver generating routine for generating a plurality of preliminary maneuvers satisfying a first set of constraints using the initial state data;

a selection routine for selecting a best preliminary maneuver from the plurality of preliminary maneuvers; and an optimizing routine for optimizing the best preliminary maneuver according to an objective function to provide a final maneuver, the optimization routine adhering to a provided second constraint.

30. The software product of claim 21, wherein multiple instantiations of the routines execute substantially concurrently.

* * * * *